(12) United States Patent
Fontes

(10) Patent No.: US 10,815,077 B2
(45) Date of Patent: Oct. 27, 2020

(54) WINDOW MANUFACTURING CONVEYOR SYSTEM AND METHOD

(71) Applicant: Ronald Fontes, Pompano Beach, FL (US)

(72) Inventor: Ronald Fontes, Pompano Beach, FL (US)

(*) Notice: Subject to any disclaimer, the term of this patent is extended or adjusted under 35 U.S.C. 154(b) by 0 days.

(21) Appl. No.: 16/515,989

(22) Filed: Jul. 18, 2019

(65) Prior Publication Data

US 2020/0109018 A1 Apr. 9, 2020

Related U.S. Application Data

(60) Provisional application No. 62/674,294, filed on May 21, 2018.

(51) Int. Cl.
*B65G 49/06* (2006.01)
*B65G 13/11* (2006.01)
*B65G 47/52* (2006.01)

(52) U.S. Cl.
CPC ............ *B65G 49/063* (2013.01); *B65G 13/11* (2013.01); *B65G 47/52* (2013.01); *B65G 49/062* (2013.01); *B65G 49/067* (2013.01); *B65G 2201/0217* (2013.01)

(58) Field of Classification Search
CPC .... B65G 49/062; B65G 49/063; B65G 13/11; B65G 47/52; B65G 2207/30; E06B 3/66; B66F 7/22
See application file for complete search history.

(56) References Cited

U.S. PATENT DOCUMENTS

| | | | | |
|---|---|---|---|---|
| 3,923,167 A * | 12/1975 | Blankenbeckler | ....... | B25H 1/00 414/11 |
| 6,739,819 B2 * | 5/2004 | Caudill | ............... | E04F 21/1811 254/4 R |
| 6,857,836 B2 * | 2/2005 | Keller | ..................... | B62B 3/022 269/905 |
| 7,014,413 B2 * | 3/2006 | Young | ..................... | B62B 3/108 269/905 |
| 7,597,527 B2 * | 10/2009 | Rodriguez | .......... | B66F 9/07568 414/684.3 |
| 7,997,845 B2 * | 8/2011 | Carlei | .................. | B65G 49/061 414/10 |
| 9,004,509 B2 * | 4/2015 | Smith | ..................... | B62B 3/108 280/651 |
| 10,689,208 B2 * | 6/2020 | Mader | ..................... | B65G 1/023 |
| 2017/0151491 A1 * | 6/2017 | Collins | ............... | B66F 9/07554 |
| 2018/0100306 A1 * | 4/2018 | Steppan | .................. | E04C 2/284 |
| 2019/0218042 A1 * | 7/2019 | Mader | .................... | B65G 1/026 |

* cited by examiner

*Primary Examiner* — Gerald McClain
(74) *Attorney, Agent, or Firm* — Melvin K Silverman

(57) ABSTRACT

A six-part conveyor system sharing a common line of dependency for the streamlined manufacturing of windows allowing both sides of the window to be easily worked on without the need for users to lift and move the window from one segment of a conveyor system to another. The window manufacturing conveyor line is designed to streamline the manufacture of windows. This system and method allows a user to easily move glass panels, speeding up productivity and provide efficiency by putting holding clips on glass in a first station, applying fast drying sealant to a tipped piece of glass in a second station, and moving to a final station where the glass window is prepared for shipping wherein the shipping cart is moved into position around the final station and window is lowered onto the cart.

2 Claims, 12 Drawing Sheets

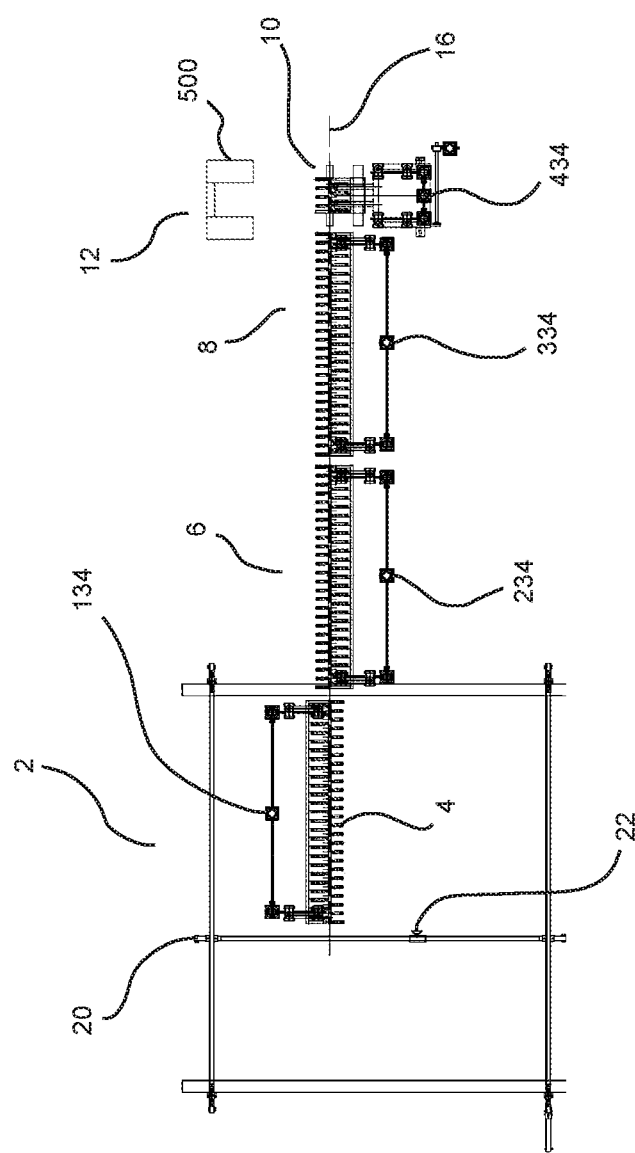

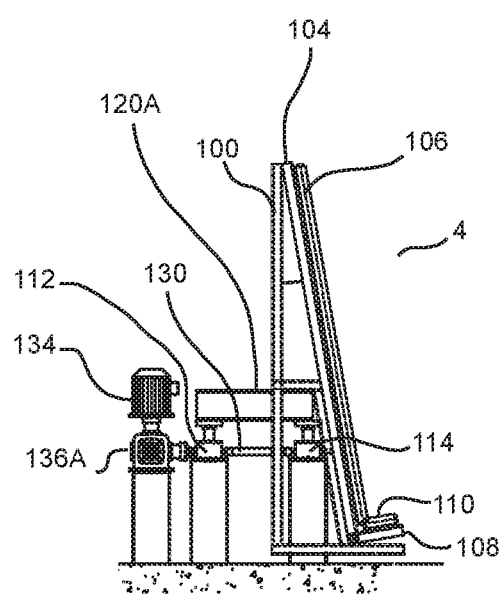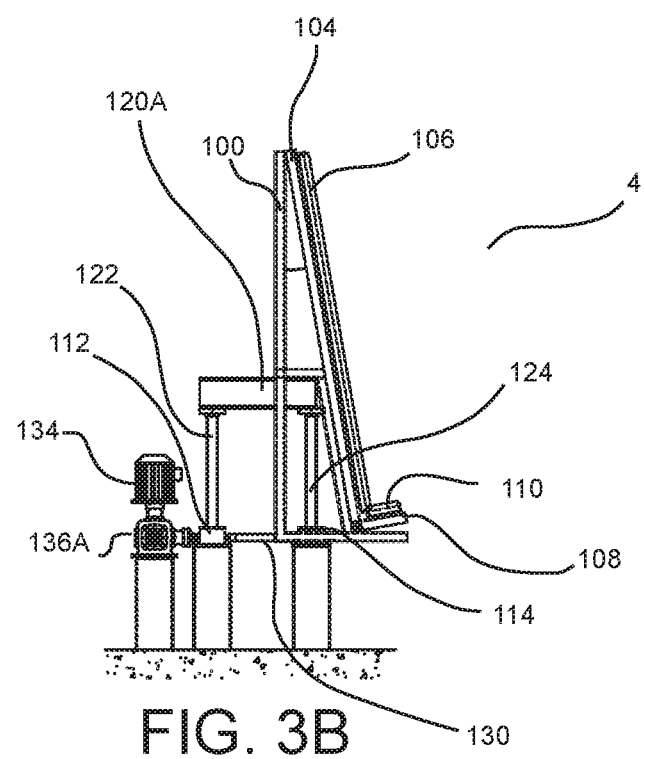

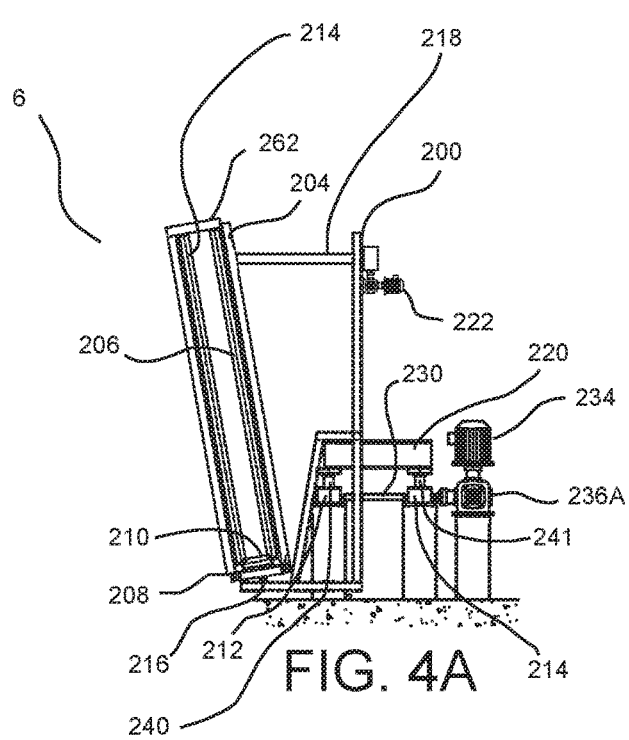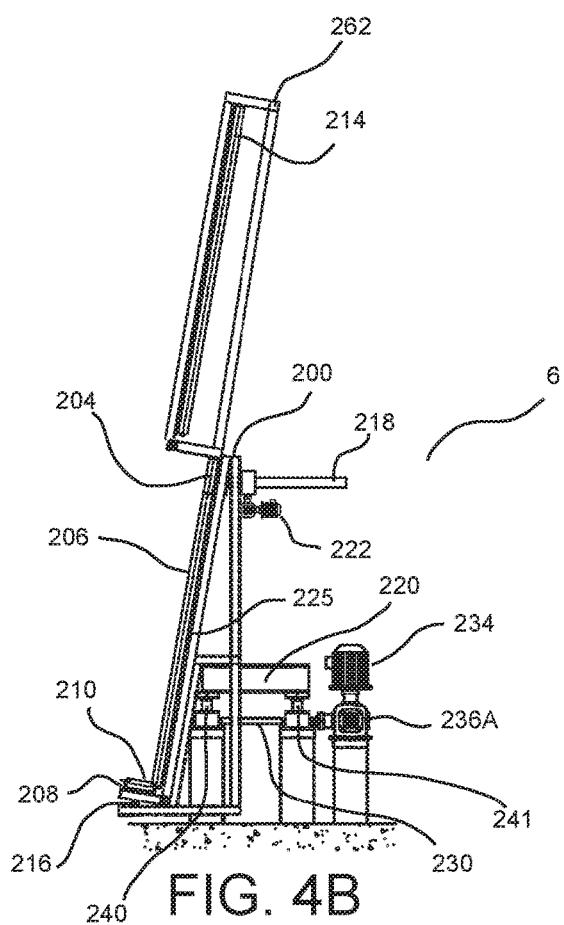

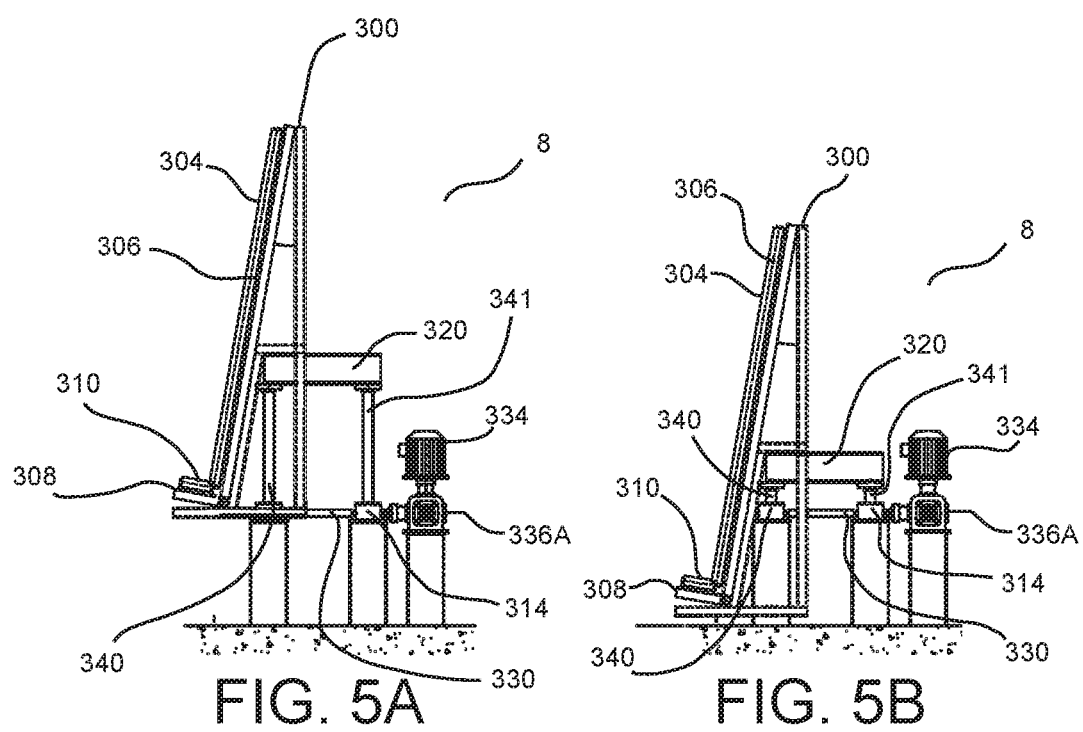

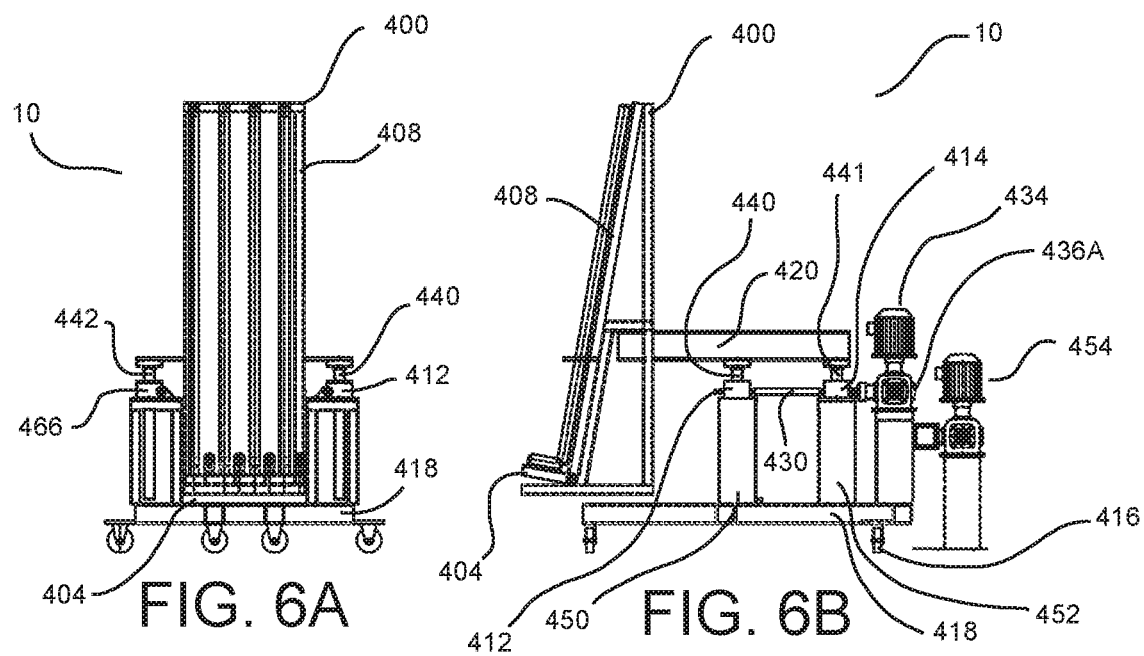

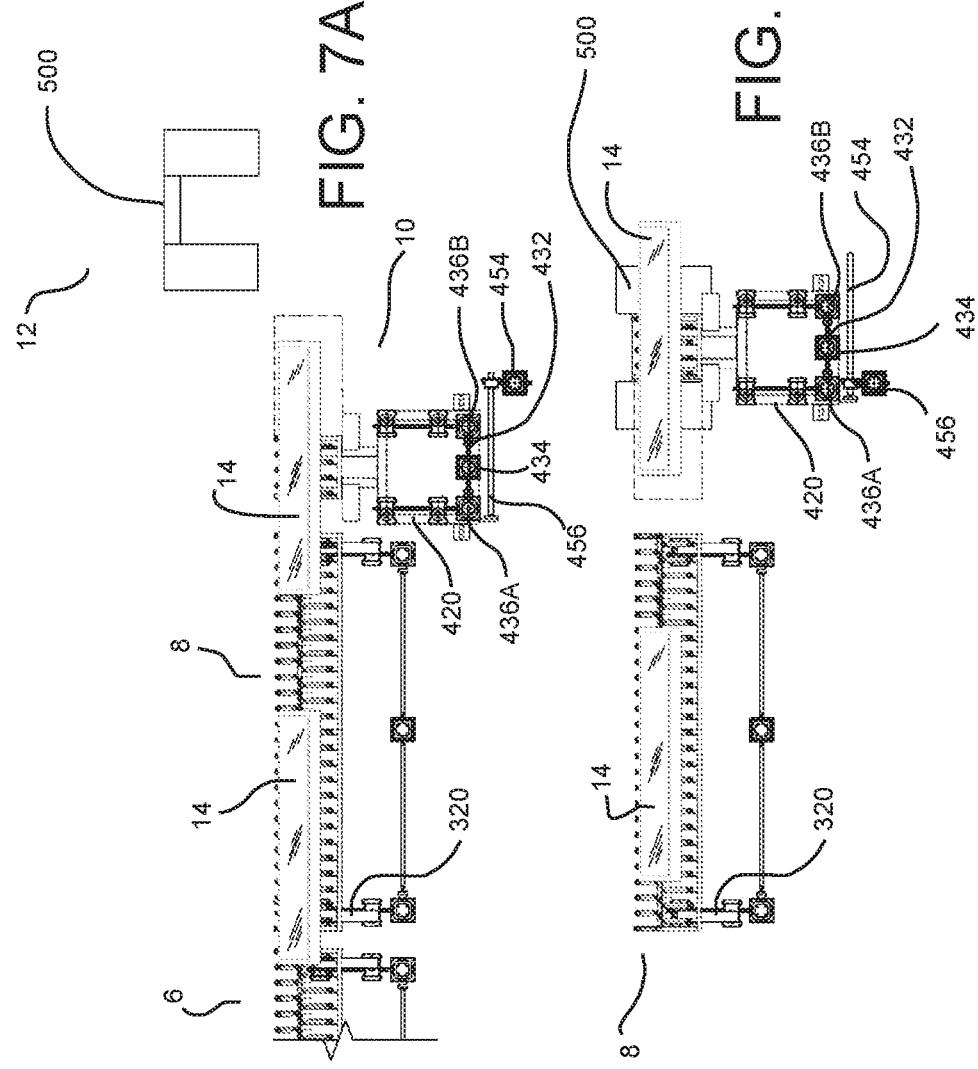

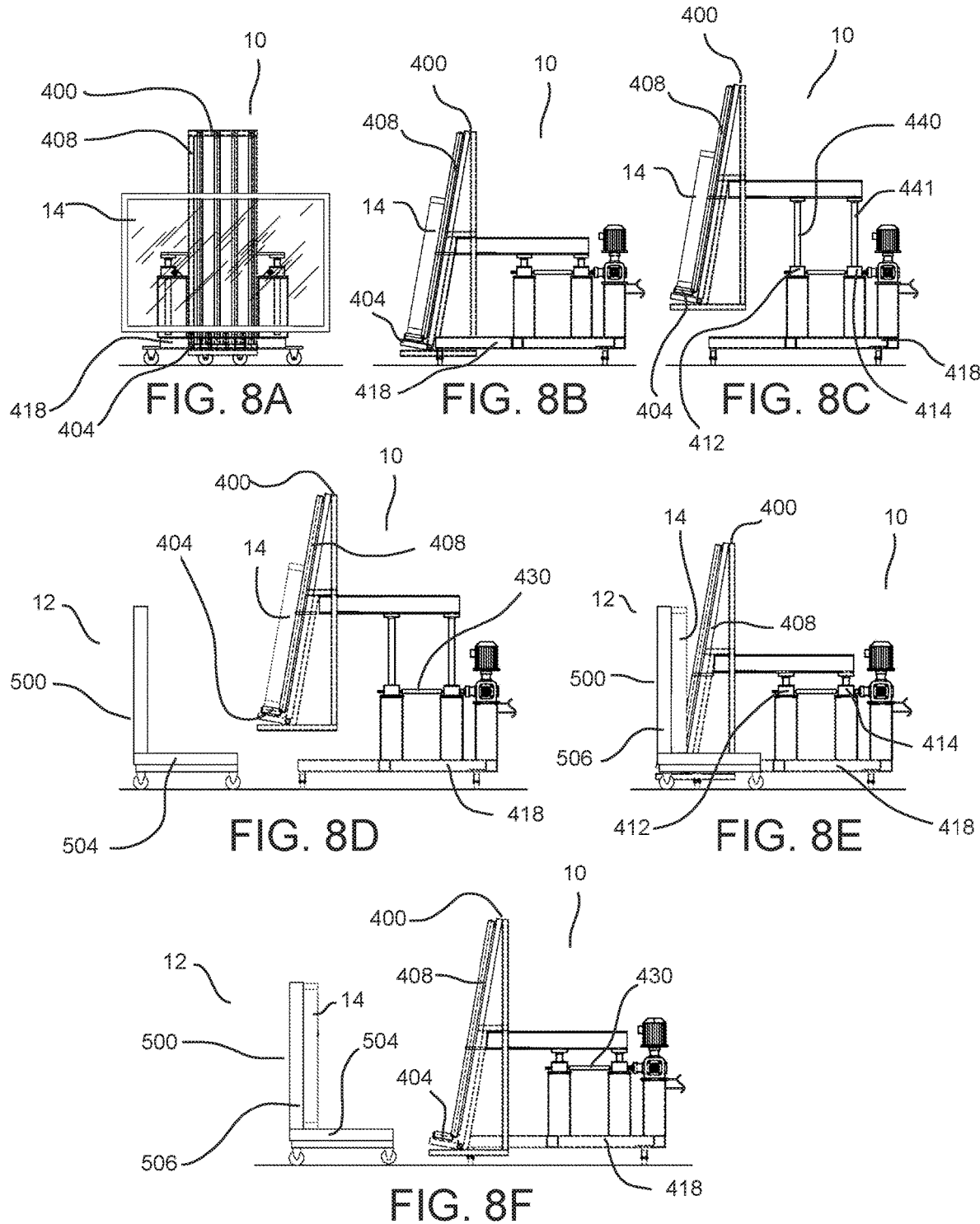

WINDOW MANUFACTURING CONVEYOR SYSTEM AND METHOD

REFERENCE TO RELATED APPLICATION

This application claims the benefit under 35 USC 119(e) of the U.S. provisional patent application Ser. No. 62/674,294 filed May 21, 2018, and the same is incorporated in its entirety.

FIELD OF THE INVENTION

The window manufacturing conveyor line is designed to streamline the manufacture of windows.

BACKGROUND OF THE INVENTION

Presently most window manufacturers use saw horses to stage window frames. The glass is carried to the window frame and inserted into the frame. The upper side of the window is mounted into the frame. Several people then turn the window over and the other side is finished.

Window is packaged and then several people lift and set the window on a shipping cart.

In the case of heavy hurricane windows the lifting process can involve 5 people.

SUMMARY OF THE INVENTION

The present invention provides for a conveyor system for the streamlined manufacturing of windows allowing both sides of the window to be easily worked on without the need for users to lift and move the window from one segment of a conveyor system to another, comprising a six-part conveyor system sharing a common line of dependency, wherein a first-part of said six-part conveyor system includes a crane with multi-directional movement and a vacuum lift for placing window material on to a second-part of said six-part system. A second-part and a fourth-part each include a lower shelf and a perpendicular supporting structure to hold said window materials, wherein the shelf includes horizontal rolling cylindrical members and said perpendicular supporting structure includes vertical rolling cylindrical members. The second-part and fourth-part are positioned facing opposite directions sharing said common line of dependency. The second-part, fourth-part, and fifth-part exist at a fixed degree tilt of about fifteen degrees from a vertical axis in order to cradle said window materials. A third-part of said six-part system includes a lower shelf and a perpendicular supporting structure to hold said window materials, wherein the shelf includes horizontal rolling cylindrical members and said perpendicular supporting structure includes vertical rolling cylindrical members, wherein said third-part is configured to pivot plus or minus about fifteen degrees from a vertical axis in order to allow for application of sealant to both sides of said window materials and tipping is achieved through use of a pivot point located on the bottom of the enclosure and an actuating member driven by a motor that is configured to push and pull the top of the enclosure. The third-part of said six-part system having a slidable enclosure, wherein said enclosure includes a support surface parallel and equal in dimension to said perpendicular support surface, wherein in an open position, said slidable enclosure is positioned vertically above said perpendicular support surface, and in a closed position said slidable enclosure is opposite of said perpendicular support surface, and slidable enclosure forming a containment area for said window materials when in said closed position to facilitate tipping of said window materials from about fifteen degrees from a vertical position to about fifteen degrees from a vertical position in the opposite direction, wherein said window materials may be supported on both vertical sides by said containment area as said tipping transfers weight from one of said support surfaces to another. A fifth-part of said six-part system, wherein said fifth-part includes a shorter conveyor surface than other said parts, configured to be shorter than said window materials to facilitate transfer to a sixth-part of the system, which includes a moveable cart. The fifth-part of the system includes wheels to facilitate lateral movement of a support frame of said conveyor surface, wherein said lateral movement is to and away from the remaining parts of the six-part conveyor system, and the fifth-part achieves movement through use of a motor which actuates a guiding member located parallel to and attached to said support structure, wherein said motor is spaced further behind said support structure than said motor in said second, third, and fourth-parts, to avoid a tipping moment on said wheels of said fifth-part. The second-part, third-part, fourth-part, and fifth-part of the system all including an assembly for raising and lowering said window materials, wherein said assembly includes a structural support frame, at least two beams for raising and lowering said structural support frame with vertical and horizontal conveyor surfaces cradling said window materials, wherein the beams are each supported by at least two jacks for raising and lowering said structural support frame, said jacks are each connected to a gear assembly driven by a shaft, wherein each shaft is connected to a main gear assembly, which connects to a main shaft, which is powered by a motor. The assembly for raising and lowering said structural support frame of said second-part, third-part, fourth-part, and fifth-part of the system includes a motor, a main shaft connected to said motor and parallel to said structural support frame, a gear assembly at the distal ends of said main shaft, wherein each said gear assembly connects perpendicularly to another shaft configured to rotate therein raising and lowering said sets of jacks located at distal ends of each structural support frame, and a beam resting atop of each said set of jacks therein supporting said structural support frame and allowing said structural support frame to raise and lower when said motor is engaged thereby rotating the main shaft, which engages the gear assemblies to rotate the perpendicular shafts, which engage each set of said jacks to raise and lower said beams supporting the structural support frame. A sixth-part of the system included a specialized cart configured to engage with said fifth-part, wherein the height of the lower surface of said cart is configured to be lower than the structural supporting frame of the fifth-part when said structural supporting frame is raised, but wherein the lower surface of the cart is above the lower part of the structural supporting frame when said structural supporting frame is lowered. The cart having a lower surface with a space in the center allowing said structural support frame of said fifth-part to lower past the lower surface of the specialized cart, and said cart having a vertical surface to allow users to push and pull said cart.

Yet further provided is a method for the streamlined manufacturing of windows allowing both sides of the window to be easily worked on without the need for users to lift and move the window from one segment of a conveyor system to another, comprising providing the structural embodiment recited above, picking up window material with said vacuum lift, using said crane to move said window material to a second-part of the system, assembling a front-part of a window from said window material, rolling said window material from said second-part of the system to said third-part of the system, engaging the motor to tip said enclosure of said third-part to align with said fourth-part, raising said enclosure so that a reverse side of said window can be assembled, sliding said window materials from said third-part of the system to said fourth-part of the system, finishing said assembly of said window from window materials, rolling said finished window from said fourth-part of the system to said fifth-part of the system, moving said fifth-part of said system away from said fourth-part of said system by running said motor which pulls said guiding member, engaging a sixth-part of the system, including said specialized cart, lowering said structural support frame of said fifth-part of said system past the lower surface of said cart, wherein the weight of the window shifts from said fifth-part to said sixth-part, and carting said window to another location.

It is an object of the present invention to provide a system that allows a user to easily move glass panels, speeding up productivity and provide efficiency.

It is yet another object of this invention to provide a system that reduces the need for users to lift materials used in window manufacturing.

It is yet another object of this invention to provide a system that allows users to easily reach both front and back sides of a window during manufacturing.

The above and yet other objects and advantages of the present invention will become apparent from the hereinafter set forth Brief Description of the Drawings, Detailed Description of the Invention and Claims appended herewith.

BRIEF DESCRIPTION OF THE DRAWINGS

FIG. 1 is a top view of the entire system.

FIG. 3A is a side view of the second-part of the system unraised looking from the front of the system.

FIG. 3B is a side view of the second-part of the system raised looking from the front of the system.

FIG. 4A is a side view of the third-part of the system with the enclosure in a closed position looking from the front of the system.

FIG. 4B is a side view of the third-part of the system with the enclosure in an open position looking from the front of the system.

FIG. 5A is a side view of the fourth-part of the system raised looking from the front of the system.

FIG. 5B is a side view of the fourth-part of the system unraised looking from the front of the system.

FIG. 6A is a front view of the fifth-part of the system, unraised.

FIG. 6B is a side view of the fifth-part of the system unraised looking from the front of the system.

FIG. 7A is a top view showing the third, fourth, fifth, and sixth-parts of the system, with the fifth-part in a position closest to the fourth-part of the system.

FIG. 7B is a top view showing the fourth, fifth, and sixth-parts of the system, with the fifth-part in a position furthest from the fourth-part of the system.

FIG. 8A is a front view of the fifth-part of the system, unraised, with window.

FIG. 8B is a side view of the fifth-part of the system unraised, with a window, looking from the front of the system.

FIG. 8C is a side view of the fifth-part of the system raised, with a window, looking from the front of the system.

FIG. 8D is a side view of the sixth-part of the system, and fifth-part of the system raised, with a window, looking from the front of the system.

FIG. 8E is a side view of the sixth-part of the system, and fifth-part of the system unraised, with a window, looking from the front of the system.

FIG. 8F is a side view of the sixth-part of the system, with a window, and fifth-part of the system unraised looking from the front of the system.

DETAILED DESCRIPTION

The window manufacturing conveyor line is designed to streamline the manufacture of windows. This system and method allow a user to easily move glass panels, speeding up productivity and provide efficiency by putting holding clips on glass in a first station, applying fast drying sealant to a tipped piece of glass in a second station, and moving to a final station where the glass window is prepared for shipping wherein the shipping cart is moved into position around the final station and window is lowered onto the cart.

The window manufacturing conveyor system allows for faster and easier production of windows in an assembly line. A window being manufactured is lifted on to a conveyor segment, the second-part, by a crane with a vacuum lift. The segments cradles the window material because it exists on an angle, fully supporting the window. Users of the system then assemble one side of the window. The segments may raise and lower allowing users to reach different parts of the window. When one side of the window is assembled, the window is rolled on to a second segment, the third-part, which is calibrated to be at the same height and angle as the prior segment allowing an easy transition from one segment to the next. On the third-part, an enclosure encasement is lowered by a hoist to fit over the window, securing the window on both sides, allowing the window to be tipped in the opposite direction to allow users access to the back side of the window. A motor drives a horizontal member, such as a shaft or rod, which pushes the top of the enclosure allowing the bottom to pivot, thus adjusting the enclosure to an opposite angulation. When the window is tipped in this third-part, the result is that of calibration equal in height and angulation to that of a third segment, the fourth-part. This fourth-part is facing in an opposite direction, respective to a common line of dependency, than that of the second-part, allowing the user access to the back of the window. The window is then rolled on to this fourth-part for further assembly. Once the back of the window is assembled, the window is rolled on to a fourth and final segment, the fifth-part, which is shorter than the width of the window, to allow for packaging for shipment. The fifth-part is able to move in the direction to and away from the conveyor system through utilization of wheels, and a motor driven actuator. Once the window is rolled on to a fifth-part, the fifth-part is moved away from the remainder of the system, and the window is packaged for shipment. A specialized cart is then engaged with the fifth-part, allowing easy transfer of the window away from the conveyor system.

Figure 2A:
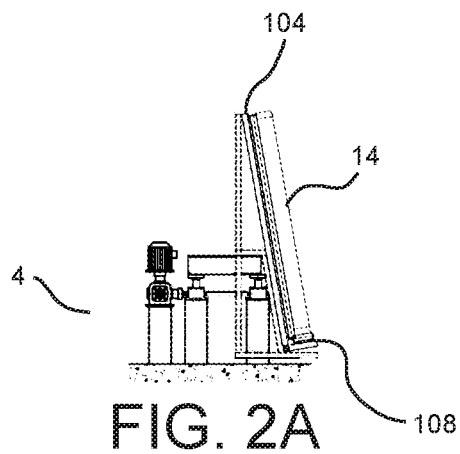
FIG. 2A is a side view of the second-part of the system looking from the front of the system.
Figure 2B:
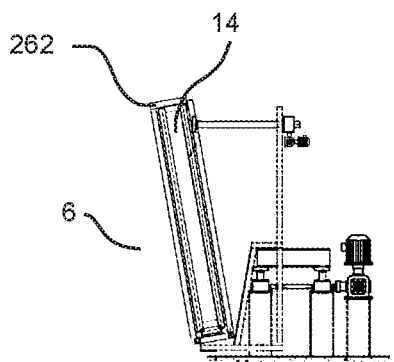
FIG. 2B is a side view of the third-part of the system with the enclosure in a closed position looking from the front of the system.
Figure 2C:
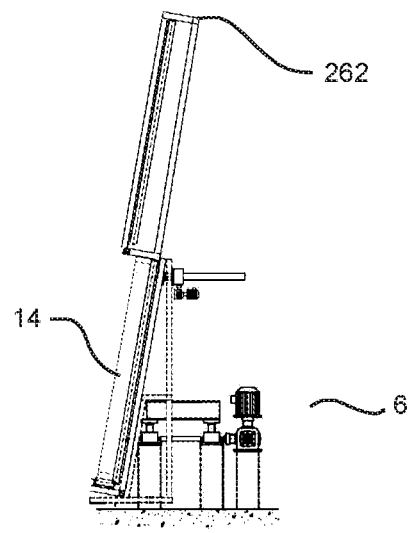
FIG. 2C is a side view of the third-part of the system with the enclosure in an open position looking from the front of the system.
Figure 2D:
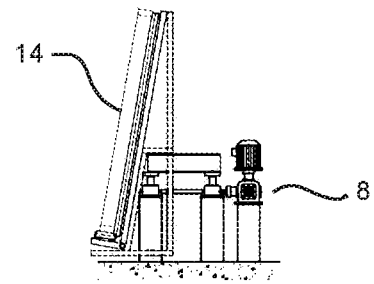
FIG. 2D is a side view of the fourth-part of the system looking from the front of the system.
Figure 2E:
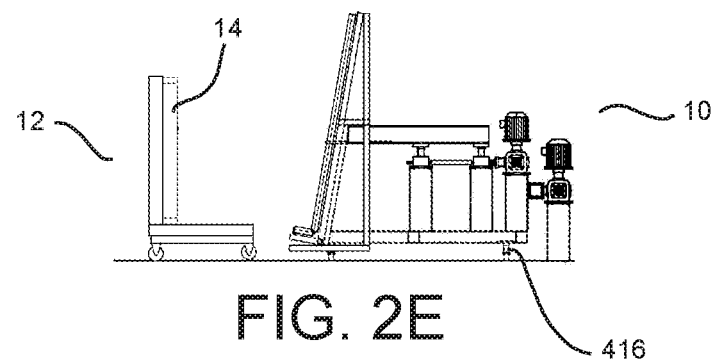
FIG. 2E is a side view of the fifth and sixth-parts of the system looking from the front of the system.

The system as a whole is shown in FIG. 1. As may be noticed, the system is broken in to six parts. The six-part system, includes a crane 20 as a first-part 2 four segments comprising a second-part 4, third-part 6, fourth-part 8, and fifth-part 10, and a specialized cart 500 as a sixth-part 12. The system is also represented by FIGS. 2A, 2B, 2C, 2D, and 2E. FIG. 2A shows the second-part of the system 4, after a window 14 has been lowered by a crane on to the cylindrical rolling members of the support surfaces 104 and 108. The window 14 is then rolled in to the enclosure 262 of the third-part of the system 6, shown in FIG. 2B. In FIG. 2C, the enclosure 262 in the third-part of the system 6 is shown in its open position, tipped in the opposite direction, and hoisted up, allowing a user to access the window 14. Upon completion of work utilizing the third-part 6, the window 14 is rolled to a fourth-part 8 as shown in FIG. 2D. The fourth-part 8 is generally similar in structure to that of the second-part 4, but as noticed by the orientations shown in FIGS. 2A and 2D, the two parts 4 and 6 are facing opposite in direction. The window is then rolled to a fifth-part of the system 10, which exists on wheels 416 to allow movement to and away from the other parts of the system. This movement is necessary to allow ample space between the fifth-part of the system 10 and fourth-part of the system 8 to allow a cart 500 of a sixth-part of the system 12 to be engaged for window loading, as further shown in FIGS. 8A through 8F.

The first-part 2, shown in FIG. 1, is a crane 20 with both vertical and lateral movement in a multi-directional XYZ coordinate system. The crane also has a vacuum lift 22, which grabs on to the glass of the window being manufactured to easily load the window on to the second-part 4.

Figure 3C:
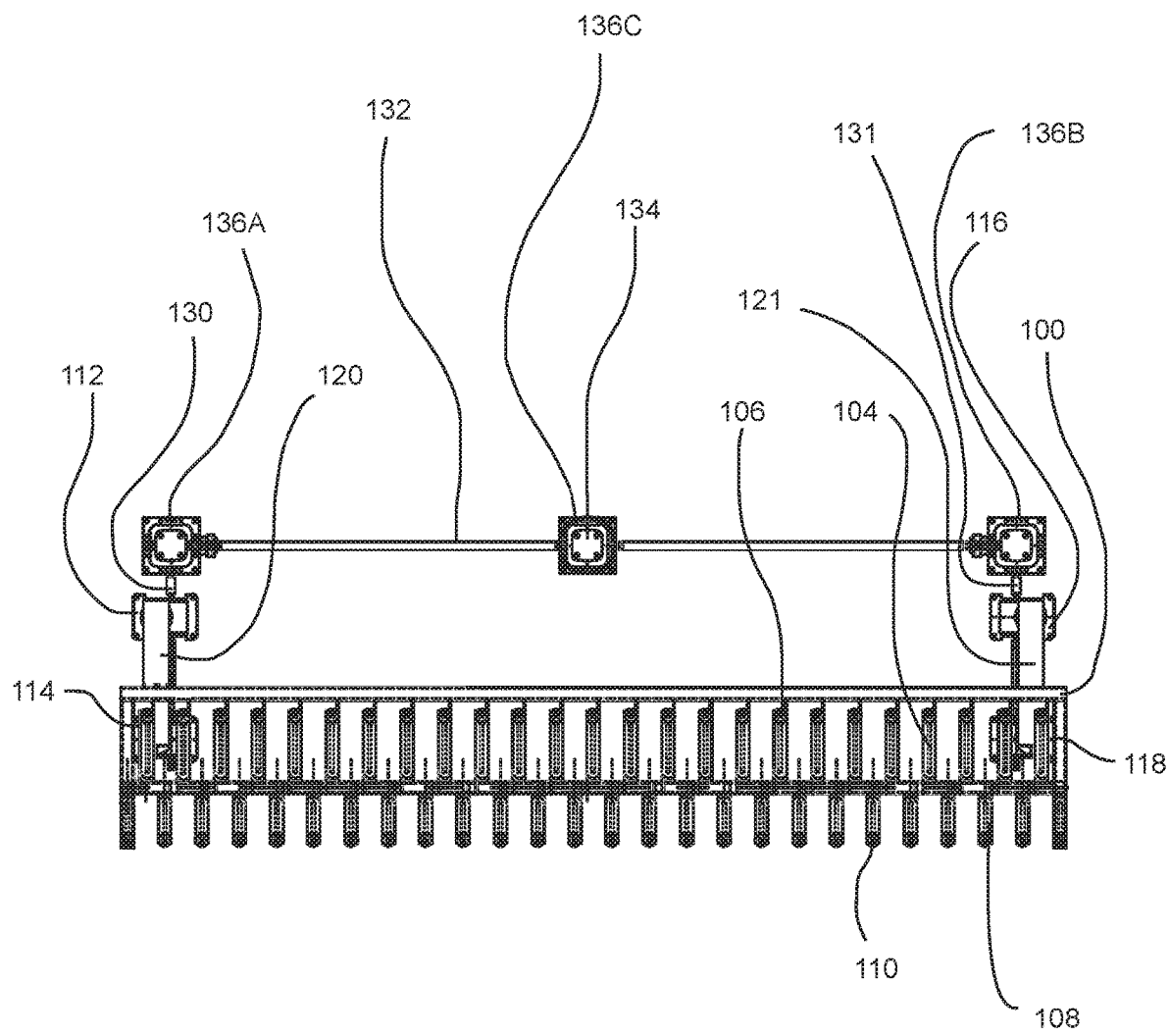
FIG. 3C is a top view of the second-part of the system.

The second-part 4, as may be seen in FIGS. 1, 2A, 3A, 3B, and 3C, includes a structural supporting frame 100 that supports conveyor surfaces 104 and 108. These conveyor surfaces exist at a fixed angle to cradle the window being manufactured. The conveyor surfaces 104 and 108 include rolling cylindrical members 106 and 110, which allow the window 14 slide down the conveyor system to new segments. The conveyor surfaces include a horizontal surface 108 acting as a shelf and a vertical surface 104 perpendicular to the horizontal surface. Further, as shown in FIGS. 3A and 3B, a pair of jacks 112/114 and 116/118 on either side of each segment lift up a structural beam member 120A/120B on either side, which then raises and lowered the structural supporting frame 100 to allow a user to reach all areas of a window 14 being manufactured.

As may be noticed in FIGS. 3A, 3B, and 3C, the frame 100 and surfaces 104 and 108 may be raised and lowered so to allow a user to reach all areas of the window 14. The structural support frame 100 rests atop of a beam 120A/120B, which is held up by two vertical members 122/124 and 126/128 of jacks 112/114 and 116/118 located at each end of the structural supporting frame 100. The jacks are engaged by rotating shaft 130, which is driven by a gearbox 136A, propelled by a main shaft 132 and a motor 134.

FIGS. 3A, 3B, and 3C show an assembly for raising and lowering the window 14 of said second-part 4, third-part 6, fourth-part 8, and fifth-part. Each includes a structural supporting frame 100, at least two beams 120/121 for raising and lowering the support frame 100. The support frame 100 and its conveyor surfaces 104 and 108 cradle the window 14. The beams 120/121 are each supported by at least two jacks 112/114 for raising and lowering the structural support frame 100. The jacks 112/114 are each connected to a gear assembly 136B/136C driven by a shaft 130, wherein each shaft 130 is connected to a main gear assembly 136A, which connects to a main shaft 132, which is powered by a motor 134.

As may be seen in FIGS. 3A, 3B, and 3C, the assembly for raising and lowering the window includes a motor 134, a main shaft 132 connected to said motor 134 and parallel to said window 14, a gear assembly 136C at the distal ends of said main shaft 132, wherein each said gear assembly connects perpendicularly to another shaft 130 configured to rotate therein raising and lowering a set of jacks 112/114 and 116/118 located at distal ends of each, and a beam 120/121 resting atop of each set of jacks 112/114 and 116/118 therein supporting said structural supporting frame 100 and allowing said frame to raise and lower when said motor 134 is engaged thereby rotating the main shaft 132, which engages the gear assemblies 136C to rotate the perpendicular shafts 130, which engage gearboxes 136A/136B engaging each set of jacks 112/114 and 116/118 to raise and lower said beams 120/121 supporting the structural supporting frame 100.

FIG. 3C is a top view of the second-part 4 of the system showing the structural support frame 100, conveyor surfaces 104 and 108, cylindrical members 106 and 110, jacks 112, 114, 116, and 118, beams 120 and 121, motor 134, shafts 130 and 131, main shaft 132, gearboxes 136A and 136B, and main gearbox 136C.

The third-part 6, similarly to the second-part, includes a structural supporting frame 200, conveyor surfaces 204 and 208, which have rolling cylindrical members 206 and 210. However, unlike the second-part 4, the fourth-part 8, and fifth-part 10, the third-part 6 includes an enclosure 262 with vertical rolling cylindrical members 214, pivot joint 216, and an upper tipping means made up of a shaft 218 actuated by a motor 222 to push and pull the top of the structural supporting frame 200 in order to pivot the surface to allow for said surfaces to line up with the second-part 4 when tipped, and the fourth-part 8 when un-tipped. The pivot joint 216 allows the enclosure 262 to move about fifteen degrees in either direction to from a vertical position.

Upon sliding a window on to enclosure 262 conveyor surface 214, structural supporting frame surface 200, and conveyor surface 208, the enclosure 262 is tipped in the opposite direction by retracting the shaft 218. The orientation of the enclosure 262 will go from complemental positioning of the structural support frame 100 of the second-part 4 to complemental positioning of the structural support frame 300 the fourth-part 8. At this point, the weight of the window 14 will be on conveyor surfaces 204 and 208 of the structural supporting frame 200. The enclosure is then hoisted up along guide rails 225. Once the enclosure 262 is raised, a user may work on the opposite side of a window 14.

Stated another way, the slidable enclosure 262 forms a containment area for the window 14 when in a closed position to facilitate tipping of the window from about fifteen degrees from a vertical position to about fifteen degrees in the opposite direction from a vertical position, wherein the window 14 is supported on both vertical sides 214 and 204 of the containment area as the tipping transfers weight from one of said support surfaces to another.

Figure 4C:
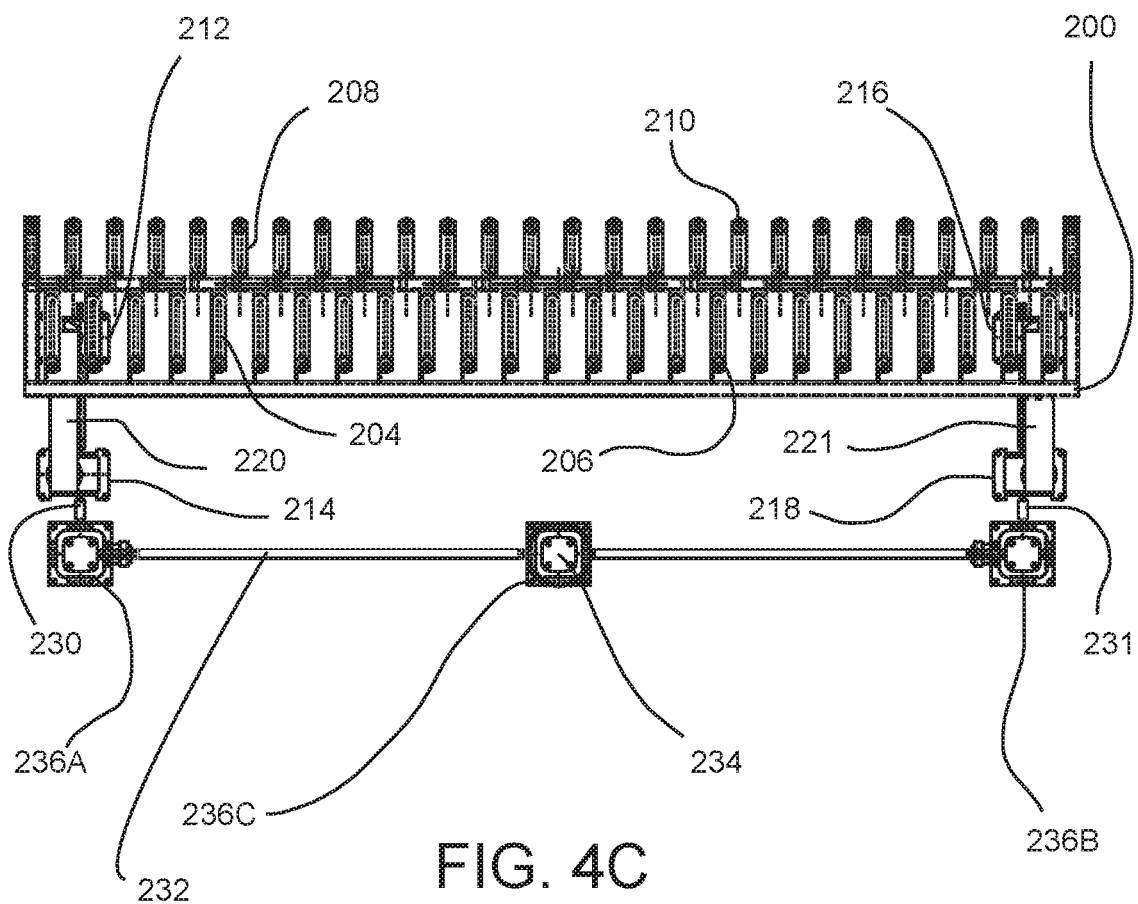
FIG. 4C is a top view of the third-part of the system.

As may be appreciated in FIGS. 4A, 4B and 4C, the frame 200 and surfaces 204 and 208 may be raised and lowered, similar to parts two through five, to allow a user to reach all areas of the window. The structural support frame 200 rests atop of a beam 220/221, which is held up by two vertical members 240/241 and 242/243 of jacks 212/214 located at each end of the structural supporting frame 200. The jacks are engaged by rotating shaft 230, which is driven by a gearbox 236A/236B, propelled by a main shaft 232 and a motor 234.

FIG. 4C is a top view of the third-part 6 of the system showing the structural support frame 200, conveyor surfaces 204 and 208, cylindrical members 206 and 210, jacks 212, 214, 216, and 218, beams 220 and 221, motor 234, shafts 230 and 231, main shaft 232, gearboxes 236A and 236B, and main gearbox 236C. Note, the enclosure 262 is not shown.

Figure 5C:
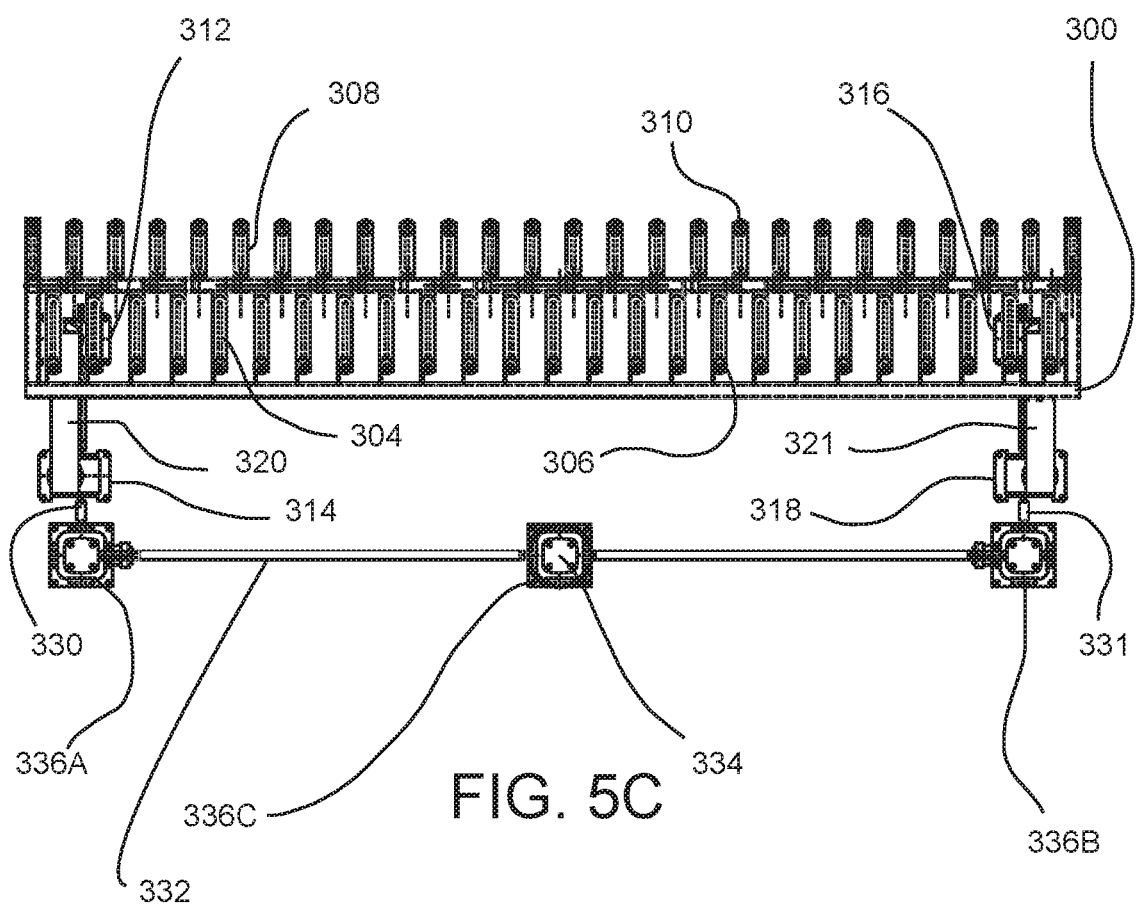
FIG. 5C is a top view of the fourth-part of the system.

The fourth-part 8, as may be seen in FIGS. 1, 2D, 5A, 5B, and 5C, includes a structural supporting frame 300 that supports conveyor surfaces 304 and 308. These conveyor surfaces exist at a fixed angle to cradle the window being manufactured. The conveyor surfaces 304 and 308 include rolling cylindrical members 306 and 310, which allow the window 14 slide down the conveyor system to new segments. The conveyor surfaces include a horizontal surface 308 acting as a shelf and a vertical surface 304 perpendicular to the horizontal surface. Further, as shown in FIGS. 5A and 5B, as well as 5C, a pair of jacks 312/314 and 316/318 on either side of each segment lift up a structural member 320/321 on either side, which then raises and lowered the structural supporting frame 300 to allow a user to reach all areas of a window being manufactured.

As may be noticed in FIGS. 5A and 5B, the frame 300 and surfaces 304 and 308 may be raised and lowered so to allow a user to reach all areas of the window 14. The structural support frame 300 rests atop of a beam 320/321, which is held up by two vertical members 340/341 and 342/343 of jacks 312/314 and 316/318 located at each end of the structural supporting frame 300. The jacks are engaged by rotating shaft 330, which is driven by a gearbox 336A/336B propelled by a main shaft 332 and a motor 334.

FIG. 5C is a top view of the fourth-part 6 of the system showing the structural support frame 300, conveyor surfaces 304 and 308, cylindrical members 306 and 310, jacks 312, 314, 316, and 318, beams 320 and 321, motor 334, shafts 330 and 331, main shaft 332, gearboxes 336A and 336B, and main gearbox 336C.

The fourth-part 8 and the second-part are generally similar in structure, but are facing opposite directions from a common line of dependency 16 as shown in FIG. 1.

FIGS. 6A, 6B, 6C, 7A, 7B, and 8A through 8F show the fifth-part 10 of the system. The fifth-part 10 of the conveyor system includes a moveable segment, support frame 400, wherein the segment, structural support frame 400, may move towards the other segments of the conveyor system to allow for transfer of a window, as shown in FIG. 7A. The moveable segment then moves away from the other parts of the conveyor system with the window still on the surfaces 408 and 404 to allow for engagement of a specialized transport cart 500, as shown in FIG. 7B.

As may be noticed, the fifth-part of the conveyor system 10 includes a shorter conveyor surface 404 and 408 than other parts of the conveyor system, configured to be shorter than the window 14 to facilitate transfer of the window 14 to moveable carts 500 of a sixth-part 12 of the conveyor system.

FIG. 6A shows an elevational view of this fifth-part, including wheels 416, connected to a structural platform 418, wherein mounts 450 and 452 connect to jacks 412 and 414, which in turn raise and lower beam 420. The wheels 416 wheels facilitate lateral movement of a support frame 400 including the conveyor surfaces 404 and 408, wherein the lateral movement is to and away from the remaining parts of the five-part conveyor system.

The fifth-part 10 achieves movement through use of a motor 454 which pulls and pushes an actuated guiding member 456 located parallel to and attached to said support structure 400.

As may be appreciated from FIG. 6B, and FIGS. 8B through 8F, the frame 400 and surfaces 404 and 408 may be raised and lowered so to allow a user to reach all areas of the window. The structural support frame 400 rests atop of a beam 420/421, which is held up by two vertical members 440/441 and 442/443 of jacks 412/414 and 466/468 located at each end of the structural supporting frame 400. The jacks are engaged by rotating shaft 430, which is driven by a gearbox 436A/436B, propelled by a main shaft 432 and a motor 434.

Because the fifth-part 10 is on wheels 416, the motor 434 of the fifth-part 10 is further away from structural support frame 400 to avoid a tipping moment due to weight of the window 14 and structural support frame 400. This may also be seen by viewing FIG. 1, wherein the motor 434 of the fifth-part 10 is further back than the motor 334 of the fourth-part 8. Because of this, the beam 420/421 of the fifth-part is longer than the beams in the other parts of the system.

Figure 6C:
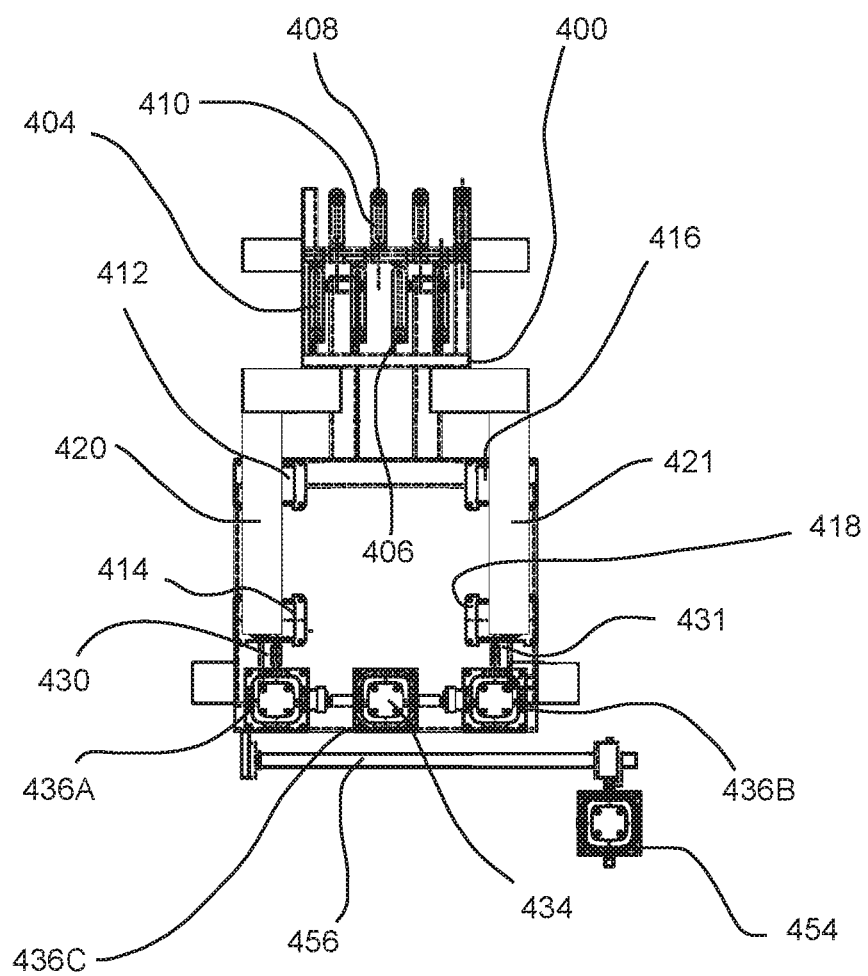
FIG. 6C is a top view of the fifth-part of the system in a position closest to the fourth-part of the system.

FIG. 6C is a top view of the fifth-part 6 of the system showing the structural support frame 400, conveyor surfaces 404 and 408, cylindrical members 406 and 410, jacks 412, 414, 416, and 418, beams 420 and 421, motor 434, shafts 430 and 431, main shaft 432, gearboxes 436A and 436B, actuated guiding member 456, motor 454, and main gearbox 436C.

Shown in FIGS. 7A and 7B are depictions showing the fifth-part 10 of the system moving to allow engagement of a sixth-part 12, a specialized cart 500, of the system in order to load the window 14 onto said cart 500. In FIG. 7A, a window 14 is seen moving between the third-part 6 and the fourth-part 8. A window 14 then moves from the fourth-part 8 to the fifth-part 10. In FIG. 7B, the window is completely on the fifth-part 10 as the motor 454 moves the actuated guiding member 456 to move the fifth-part 10 away from the fourth-part 8. A cart 500 of the sixth-part 12 may then engage with the window 14. As may be seen, the cart 500 of the sixth-part 12 engages perpendicularly to the window 14 currently resting on the fifth-part 10 of the conveyor system.

FIGS. 8A through 8F depict the loading of a completed window 14 from the fifth-part 10 of the conveyor system to the specialized cart 500, the sixth-part 12 of the conveyor system.

FIG. 8A is a view facing the front of the fifth-part 10 with structural support frame 400 in a lowered position and a window 14 on the horizontal conveyor surface 408. FIG. 8B is a side view of the positioning of the fifth-part 10 depicted in FIG. 8A. Further noticed in FIG. 8B is the beam 420 is lowered as the jacks 412/414 have not actuated the beam 420 upward. In contrast, FIG. 8C shows the jacks 412/414 actuating the vertical members 440/441, raising beam 420. This raises the window 14 up to allow for engagement of a specialized cart 500. FIG. 8D shows the specialized cart 500 of the sixth-part of the system 12. Notice that there is provided space between the lower vertical surface 504 of the cart 500 and the bottom of the structural support frame 400 to allow the cart 500 to move in below the structural support frame 400. FIG. 8E shows the vertical members 440/441 lowered by jacks 412/414 resulting in the cart 500 positioned partially under the structural support frame 400, the lower surface 504 of the cart 500 positioned above the bottom of the support frame 400. This positioning allows the window 14 to shift weight from the fifth-part 10 to the sixth-part 12, thereby allowing a user to cart the window 14 where it needs to go for shipping. Also shown is the vertical member 506 of the cart 500.

This invention also includes a method for the streamlined manufacturing of windows allowing both sides of the window to be easily worked on without the need for users to lift and move the window 14 from one segment of a conveyor system to another. This can be visualized by looking at FIGS. 1 through 8F. The method includes the steps of providing the structural embodiment recited above, picking up window material 14 with said vacuum lift 22, using said crane 20 to move said window material 14 to a second-part 4 of the system, assembling a front-part of a window 14 from said window 14 material, rolling said window 14 material from said second-part 4 of the system to said third-part 6 of the system, engaging the motor 222 to tip said enclosure 262 of said third-part 6 to align with said fourth-part 8, raising said enclosure 262 so that a reverse side of said window 14 can be assembled, sliding said window 14 materials from said third-part 6 of the system to said fourth-part 8 of the system, finishing said assembly of said window 14 from window 14 materials, rolling said finished window 14 from said fourth-part 8 of the system to said fifth-part 10 of the system, moving said fifth-part 10 of said system away from said fourth-part 8 of said system by running said motor 454 which pulls said guiding member 456, engaging a sixth-part 12 of the system, including said specialized cart 500, lowering said structural support frame 400 of said fifth-part 10 of said system past the lower surface 504 of said cart 500, wherein the weight of the window 14 shifts from said fifth-part 10 to said sixth-part 12, and carting said window 14 to another location.

While there has been shown and described above the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

I claim:

1. A conveyor system for the streamlined manufacturing of windows allowing both sides of the window to be easily worked on without the need for users to lift and move the window from one segment of a conveyor system to another, comprising:
   a six-part conveyor system sharing a common line of dependency, wherein a first-part of said six-part conveyor system includes a crane with multi-directional movement and a vacuum lift for placing window material on to a second-part of said six-part system;
   said second-part and a fourth-part each include a lower shelf and a perpendicular supporting structure to hold said window materials, wherein the shelf includes horizontal rolling cylindrical members and said perpendicular supporting structure includes vertical rolling cylindrical members;
   said second-part and fourth-part are positioned facing opposite directions sharing said common line of dependency;
   said second-part, fourth-part, and fifth-part exist at a fixed fifteen degree tilt from a vertical axis in order to cradle said window materials;
   a third-part of said six-part system includes a lower shelf and a perpendicular supporting structure to hold said window materials, wherein the shelf includes horizontal rolling cylindrical members and said perpendicular supporting structure includes vertical rolling cylindrical members;
   said third-part is configured to pivot plus or minus fifteen degrees from a vertical axis in order to allow for application of sealant to both sides of said window materials;
   said tipping is achieved through use of a pivot point located on the bottom of the enclosure and an actuating member driven by a motor that is configured to push and pull the top of the enclosure;
   said third-part of said six-part system having a slidable enclosure, wherein said enclosure includes a support surface parallel and equal in dimension to said perpendicular support surface, wherein in an open position, said slidable enclosure is positioned vertically above said perpendicular support surface, and in a closed position said slidable enclosure is opposite of said perpendicular support surface;
   said slidable enclosure forming a containment area for said window materials when in said closed position to facilitate tipping of said window materials from fifteen degrees from a vertical position to fifteen degrees from a vertical position in the opposite direction, wherein said window materials may be supported on both vertical sides by said containment area as said tipping transfers weight from one of said support surfaces to another;
   a fifth-part of said six-part system, wherein said fifth-part includes a shorter conveyor surface than other said parts, configured to be shorter than said window materials to facilitate transfer to a sixth-part of the system, which includes a moveable cart;
   said fifth-part of the system includes wheels to facilitate lateral movement of a support frame of said conveyor surface, wherein said lateral movement is to and away from the remaining parts of the six-part conveyor system;
   said fifth-part achieves movement through use of a motor which actuates a guiding member located parallel to and attached to said support structure, wherein said motor is spaced further behind said support structure than said motor in said second, third, and fourth-parts, to avoid a tipping moment on said wheels of said fifth-part;
   said second-part, third-part, fourth-part, and fifth-part of the system all including an assembly for raising and lowering said window materials, wherein said assembly includes a structural support frame, at least two beams for raising and lowering said structural support frame with vertical and horizontal conveyor surfaces cradling said window materials, wherein the beams are each supported by at least two jacks for raising and lowering said structural support frame, said jacks are each connected to a gear assembly driven by a shaft, wherein each shaft is connected to a main gear assembly, which connects to a main shaft, which is powered by a motor; and
   said assembly for raising and lowering said structural support frame of said second-part, third-part, fourth-part, and fifth-part of the system includes:
   (i) said motor;
   (ii) said main shaft connected to said motor and parallel to said structural support frame;

(iii) said gear assembly at the distal ends of said main shaft, wherein each said gear assembly connects perpendicularly to another shaft configured to rotate therein raising and lowering said sets of jacks located at distal ends of each structural support frame; and (iv) said beam resting atop of each said set of jacks therein supporting said structural support frame and allowing said structural support frame to raise and lower when said motor is engaged thereby rotating the main shaft, which engages the gear assemblies to rotate the perpendicular shafts, which engage each set of said jacks to raise and lower said beams supporting the structural support frame;

a sixth-part of the system including a specialized cart configured to engage with said fifth-part, wherein the height of the lower surface of said cart is configured to be lower than the structural supporting frame of the fifth-part when said structural supporting frame is raised, but wherein the lower surface of the cart is above the lower part of the structural supporting frame when said structural supporting frame is lowered;

said cart having a lower surface with a space in the center allowing said structural support frame of said fifth-part to lower past the lower surface of the specialized cart; and said cart having a vertical surface to allow users to push and pull said cart.

2. A method for the streamlined manufacturing of windows allowing both sides of the window to be easily worked on without the need for users to lift and move the window from one segment of a conveyor system to another, comprising:

providing:

a six-part conveyor system sharing a common line of dependency, wherein a first-part of said six-part conveyor system includes a crane with multi-directional movement and a vacuum lift for placing window material on to a second-part of said six-part system;

said second-part and a fourth-part each include a lower shelf and a perpendicular supporting structure to hold said window materials, wherein the shelf includes horizontal rolling cylindrical members and said perpendicular supporting structure includes vertical rolling cylindrical members;

said second-part and fourth-part are positioned facing opposite directions sharing said common line of dependency;

said second-part, fourth-part, and fifth-part exist at a fixed [number] degree tilt from a vertical axis in order to cradle said window materials;

a third-part of said six-part system includes a lower shelf and a perpendicular supporting structure to hold said window materials, wherein the shelf includes horizontal rolling cylindrical members and said perpendicular supporting structure includes vertical rolling cylindrical members;

said third-part is configured to pivot plus or minus [number] degrees from a vertical axis in order to allow for application of sealant to both sides of said window materials;

said tipping is achieved through use of a pivot point located on the bottom of the enclosure and an actuating member driven by a motor that is configured to push and pull the top of the enclosure;

said third-part of said six-part system having a slidable enclosure, wherein said enclosure includes a support surface parallel and equal in dimension to said perpendicular support surface, wherein in an open position, said slidable enclosure is positioned vertically above said perpendicular support surface, and in a closed position said slidable enclosure is opposite of said perpendicular support surface;

said slidable enclosure forming a containment area for said window materials when in said closed position to facilitate tipping of said window materials from [number] degrees from a vertical position to [number] degrees from a vertical position in the opposite direction, wherein said window materials may be supported on both vertical sides by said containment area as said tipping transfers weight from one of said support surfaces to another;

a fifth-part of said six-part system, wherein said fifth-part includes a shorter conveyor surface than other said parts, configured to be shorter than said window materials to facilitate transfer to a sixth-part of the system, which includes a moveable cart;

said fifth-part of the system includes wheels to facilitate lateral movement of a support frame of said conveyor surface, wherein said lateral movement is to and away from the remaining parts of the six-part conveyor system;

said fifth-part achieves movement through use of a motor which actuates a guiding member located parallel to and attached to said support structure, wherein said motor is spaced further behind said support structure than said motor in said second, third, and fourth-parts, to avoid a tipping moment on said wheels of said fifth-part;

said second-part, third-part, fourth-part, and fifth-part of the system all including an assembly for raising and lowering said window materials, wherein said assembly includes a structural support frame, at least two beams for raising and lowering said structural support frame with vertical and horizontal conveyor surfaces cradling said window materials, wherein the beams are each supported by at least two jacks for raising and lowering said structural support frame, said jacks are each connected to a gear assembly driven by a shaft, wherein each shaft is connected to a main gear assembly, which connects to a main shaft, which is powered by a motor; and said assembly for raising and lowering said structural support frame of said second-part, third-part, fourth-part, and fifth-part of the system includes:

(i) said motor;

(ii) said main shaft connected to said motor and parallel to said structural support frame;

(iii) said gear assembly at the distal ends of said main shaft, wherein each said gear assembly connects perpendicularly to another shaft configured to rotate therein raising and lowering said sets of jacks located at distal ends of each structural support frame; and (iv) said beam resting atop of each said set of jacks therein supporting said structural support frame and allowing said structural support frame to raise and lower when said motor is engaged thereby rotating the main shaft, which engages the gear assemblies to rotate the perpendicular shafts, which engage each set of said jacks to raise and lower said beams supporting the structural support frame;

a sixth-part of the system including a specialized cart configured to engage with said fifth-part, wherein the height of the lower surface of said cart is configured to be lower than the structural supporting frame of the fifth-part when said structural supporting frame is raised, but wherein the lower surface of the cart is above the lower part of the structural supporting frame when said structural supporting frame is lowered;

said cart having a lower surface with a space in the center allowing said structural support frame of said fifth-part to lower past the lower surface of the specialized cart; and said cart having a vertical surface to allow users to push and pull said cart;

picking up window material with said vacuum lift;

using said crane to move said window material to a second-part of the system;

assembling a front part of a window from said window material;

rolling said window material from said second-part of the system to said third-part of the system;

engaging the motor to tip said enclosure of said third-part to align with said fourth-part;

raising said enclosure so that a reverse side of said window can be assembled;

sliding said window materials from said third-part of the system to said fourth-part of the system;

finishing said assembly of said window from window materials;

rolling said finished window from said fourth-part of the system to said fifth-part of the system;

moving said fifth-part of said system away from said fourth-part of said system by running said motor which pulls said guiding member;

engaging a sixth-part of the system, including said specialized cart;

lowering said structural support frame of said fifth-part of said system past the lower surface of said cart, wherein the weight of the window shifts from said fifth-part to said sixth-part; and carting said window to another location.

* * * * *